US009228448B2

(12) United States Patent
Wind et al.

(10) Patent No.: US 9,228,448 B2

(45) Date of Patent: Jan. 5, 2016

(54) BACKGROUND RADIATION MEASUREMENT SYSTEM

(71) Applicant: United Technologies Corporation, Hartford, CT (US)

(72) Inventors: Darren M. Wind, Glastonbury, CT (US); Mark A. Davidson, Palm Drive, FL (US); Eli Cole Warren, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/480,752

(22) Filed: Sep. 9, 2014

(65) Prior Publication Data

US 2015/0083919 A1 Mar. 26, 2015

Related U.S. Application Data

(60) Provisional application No. 61/880,223, filed on Sep. 20, 2013.

(51) Int. Cl.

*G01J 5/02* (2006.01)

*F01D 21/00* (2006.01)

(52) U.S. Cl.

CPC .......... *F01D 21/003* (2013.01); *F05D 2270/80* (2013.01)

(58) Field of Classification Search

CPC .......... G01N 21/00; G01N 25/00; G01N 3/00

USPC .......... 250/341.1-341.8

See application file for complete search history.

(56) References Cited

U.S. PATENT DOCUMENTS

| | | | | |
|---|---|---|---|---|
| 3,710,771 | A * | 1/1973 | Cinquegrani | 123/445 |
| 5,761,956 | A | 6/1998 | Beeson | |
| 6,056,998 | A * | 5/2000 | Fujimoto | 427/240 |
| 7,707,889 | B2 | 5/2010 | Maurus et al. | |
| 8,096,184 | B2 | 1/2012 | Twerdochlib | |
| 8,413,493 | B1 | 4/2013 | Polywoda, III | |
| 2003/0118445 | A1* | 6/2003 | Lee et al. | 416/97 R |
| 2005/0106028 | A1* | 5/2005 | Ahmad | 416/228 |
| 2006/0289310 | A1* | 12/2006 | Matson et al. | 204/484 |
| 2009/0185913 | A1* | 7/2009 | Ahmad et al. | 416/97 R |
| 2012/0101769 | A1 | 4/2012 | Zombo et al. | |

* cited by examiner

*Primary Examiner* — Kiho Kim

(74) *Attorney, Agent, or Firm* — Carlson, Gaskey & Olds, P.C.

(57) ABSTRACT

A turbine section according to an exemplary aspect of the present disclosure includes, among other things, an airfoil including an edge and a probe positioned a distance from the airfoil. The probe is configured to detect radiation emitted from a radiation source. A sensor is operatively coupled to the probe and is configured to generate a signal utilized to determine when the edge of the airfoil extends into a line-of-sight between the probe and the radiation source.

23 Claims, 4 Drawing Sheets

BACKGROUND RADIATION MEASUREMENT SYSTEM

BACKGROUND

This disclosure relates to a gas turbine engine, and more particularly to a background radiation measurement system.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

A typical turbine section includes at least one array of turbine blades arranged circumferentially about an about an engine central longitudinal axis. The turbine blades are subject to thermal distress due to the hot combustion gases, as well as mechanical distress at high rotational speeds about an engine axis. In some instances, the turbine blades may vibrate or deflect due to thermal and mechanical stresses or cracking.

Typical stress measurement systems include a laser source and a photo-detector mounted remotely away from the engine and connected to a probe via fiber optics cables. The laser source emits a laser beam via a transmit fiber and a lens onto each of the turbine blades as the turbine blades rotate through the field-of-view of the probe. The surface of each turbine blade reflects the laser beam toward a receive lens and fiber, which communicate the light to the photo-detector which converts the light to an electrical signal and in turn triggers a timer. This time is recorded to determine a "time of arrival" of the turbine blade. The turbine blades are positioned downstream from the combustor section. Thus, the system is typically configured to filter background radiation generated by a flame (which may closely match the wave length the photo-detector expects) from the combustor in order to minimize noise, which may affect the detection of the time of arrival of the blade, vibratory modes of interest, or signal strength. Accordingly, a system configured to receive radiation from a background radiation source is desirable.

SUMMARY

In a featured embodiment, a turbine section has an airfoil including an edge. A probe is positioned a distance from the airfoil configured to detect radiation emitted from a radiation source. A sensor is operatively coupled to the probe and configured to generate a signal utilized to determine when the edge of the airfoil extends into a line-of-sight between the probe and the radiation source.

In another embodiment according to the previous embodiment, the sensor generates the signal in response to passage of the edge through the line-of-sight.

In another embodiment according to any of the previous embodiments, a controller is electrically coupled to the sensor. The controller is configured to calculate a spacing deviation based upon a comparison of an expected time of arrival and an actual time of arrival of the edge. The actual time of arrival is based upon the signal.

In another embodiment according to any of the previous embodiments, the sensor is an infrared sensor.

In another embodiment according to any of the previous embodiments, the infrared sensor is configured to detect a wavelength in an electromagnetic radiation frequency range.

In another embodiment according to any of the previous embodiments, the radiation source is a combustor.

In another embodiment according to any of the previous embodiments, the radiation source emits radiation at a first frequency range and the airfoil emits radiation at a second frequency range different from the first frequency range.

In another embodiment according to any of the previous embodiments, the radiation source emits radiation at a first range of amplitudes and the airfoil emits radiation at a second range of amplitudes different from the first range of amplitudes.

In another embodiment according to any of the previous embodiments, the probe includes a housing extending radially inward from a platform of a stator vane.

In another embodiment according to any of the previous embodiments, the housing is configured to receive coolant from a coolant source.

In another featured embodiment, a gas turbine engine has a compressor section, a combustor section, and a turbine section including a plurality of turbine blades and a plurality of stator vanes arranged circumferentially about an engine axis. At least one probe is positioned a distance from the turbine blades configured to detect radiation emitted from the combustor section. A sensor is operatively coupled to the probe and configured to generate a signal utilized to determine when an edge of each of the turbine blades extends into a line-of-sight between the probe and the combustor section.

In another embodiment according to the previous embodiment, the edge is a trailing edge of one of the turbine blades. The sensor generates the signal in response to passage of the trailing edge through the line-of-sight.

In another embodiment according to any of the previous embodiments, a controller is electrically coupled to the sensor. The controller is operable to calculate a spacing deviation based upon a comparison of an expected time of arrival and an actual time of arrival of the trailing edge. The actual time of arrival is based upon the signal.

In another embodiment according to any of the previous embodiments, the sensor is an infrared sensor.

In another embodiment according to any of the previous embodiments, at least two probes are spaced apart from each other circumferentially about the engine axis.

In another embodiment according to any of the previous embodiments, the turbine section is a low pressure turbine spaced axially from a high pressure turbine.

In another embodiment according to any of the previous embodiments, at least one probe includes a housing extending radially inward from a platform of one of the stator vanes.

In another featured embodiment, a method of monitoring an airfoil includes emitting radiation from a combustor. Radiation is detected along a line-of-sight from a position a distance from an airfoil. A signal is generated in response to rotation of the airfoil through the line-of-sight. The signal is based upon radiation emitted from the combustor.

In another embodiment according to any of the previous embodiments, the signal corresponds to a trailing edge of the airfoil extending into the line-of-sight.

In another embodiment according to any of the previous embodiments, the radiation emitted by the combustor is infrared radiation.

These and other features disclosed herein can be best understood from the following specification and drawings, the following of which is a brief description.

DETAILED DESCRIPTION

Figure 1:
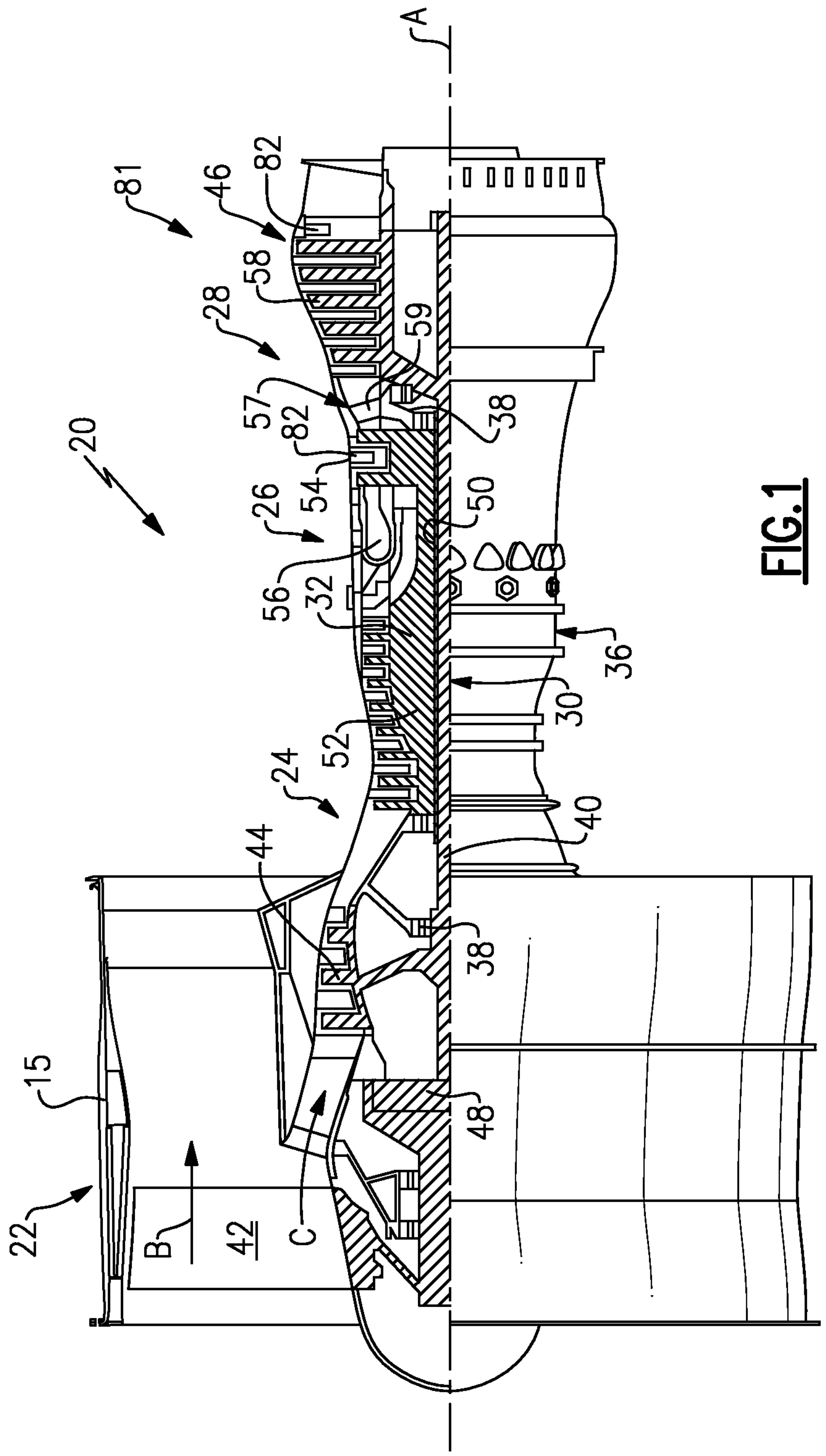
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}^\circ \text{R})/(518.7^\circ \text{R})]^{0.5}$. The "Low corrected fan tip speed" as disclosed herein according to one non-limiting embodiment is less than about 1150 ft/second.

Figure 2:
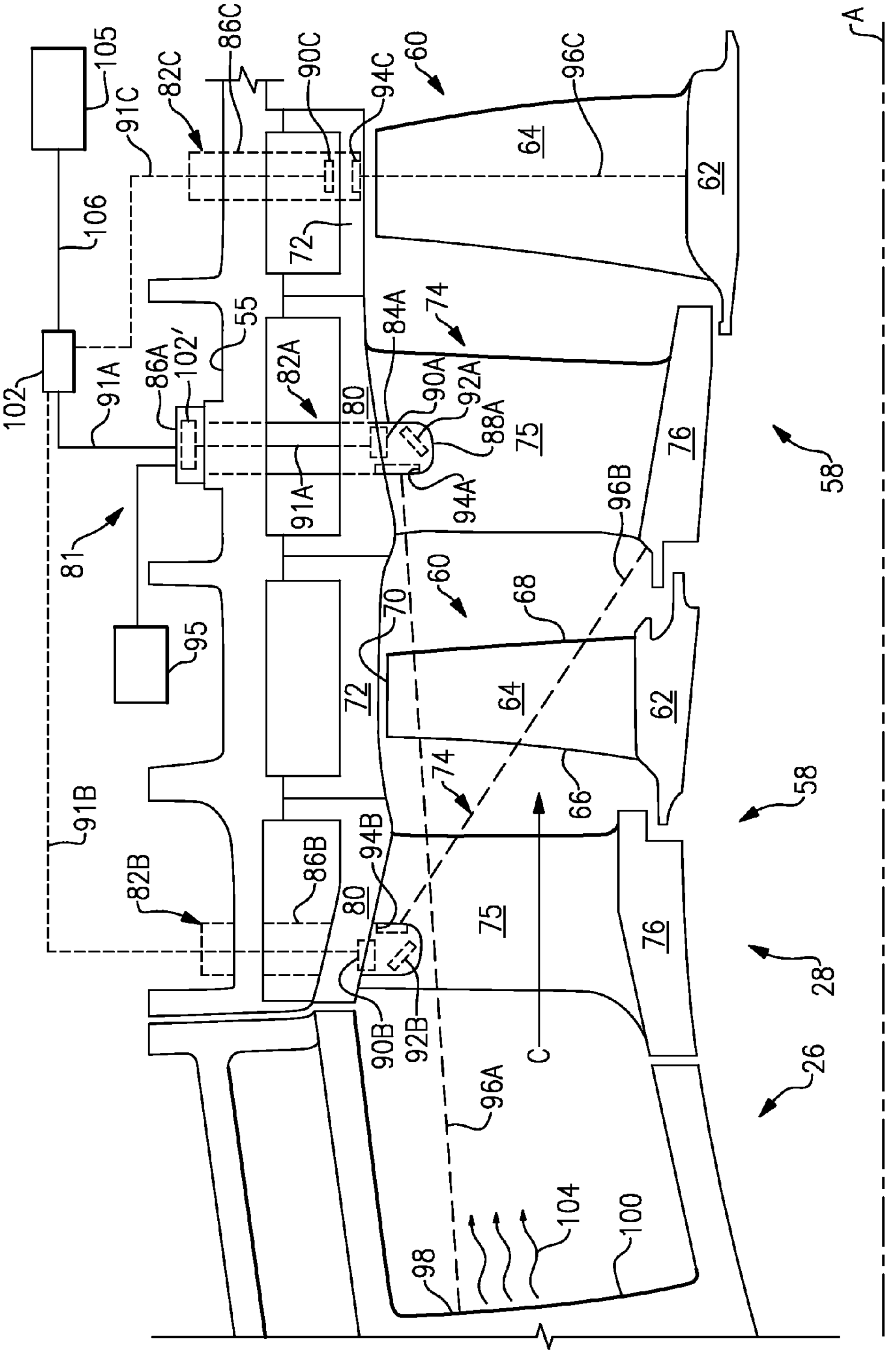
FIG. 2 illustrates a schematic view of a turbine section including a background radiation measurement system.

FIG. 2 illustrates a schematic view of a combustor section 26 and a turbine section 28. The turbine section 28 includes one or more stages 58, each of the stages 58 including a plurality of rotor blades 60 and a plurality of stator vanes 74 arranged circumferentially about the engine axis A. Each of the rotor blades 60 includes a root 62 and a rotor airfoil 64 extending radially outward from the root 62. The rotor airfoil 64 extends between a leading edge 66 and a trailing edge 68 and terminates at a tip 70. Each tip 70 is spaced a distance from an array of blade outer air seals (BOAS) 72 arranged circumferentially about the engine axis A. Each of stator vanes 74 includes a vane airfoil 75 extending radially between an inner platform 76 and an outer platform 80. The root 62, platforms 76, 80 and BOAS 72 define an inner and outer radial flow path boundary for a core flow path C.

The turbine section 28 includes a background radiation measurement system 81 for monitoring a condition of each of the rotor airfoils 64. In this disclosure, like reference numerals designate like elements where appropriate and reference numerals with the addition of one-hundred or multiples thereof designate modified elements that are understood to incorporate the same features and benefits of the corresponding original elements. In some examples, the background radiation measurement system 81 is located in a high pressure turbine 54. In other examples, the background radiation measurement system 81 is located in the low pressure turbine 46. In further examples, the background radiation measurement system is located in the low pressure turbine 46 and the high pressure turbine 54 (shown schematically in FIG. 1). The background radiation measurement system 81 can be utilized for high cycle fatigue measurements and other time of arrival based measurements on any rotor blades backlit by a combustor 26 or another electromagnetic radiation source. It is to be understood that other sections of the gas turbine engine 20 and other systems such as ground based systems can benefit from the examples disclosed herein which are not limited to the design shown.

The background radiation measurement system 81 includes a background radiation probe 82A. The probe 82A includes a housing 84A extending between a distal end 86A and a proximal end 88A. In some embodiments, the distal end 86A extends radially outward through a turbine case 55. The proximal end 88A of the housing 84A extends radially inward from one of the outer platforms 80 and into the core flow path C. The probe 82A is positioned a distance from the rotor blades 60. In one example, the probe 82A is positioned downstream of the rotor blades 60. In some examples, each stage 58 includes one probe 82A. In other examples, each stage 58 includes at least two probes 82A spaced apart from each other circumferentially about the engine axis A. However, other positions of each probe are contemplated. In some examples, the probe is positioned upstream of the rotor blades 60. In other examples, the probe is positioned at the outer radial flow path boundary for the core flow path C (shown in FIG. 2). In yet other examples, the probe is positioned at the inner radial flow path boundary for the core flow path C. In some examples, a ceramic coating is applied to an external surface of the housing 84A to minimize thermal distress due to exposure from the hot combustion gases flowing within the core flow path C.

Figure 3:
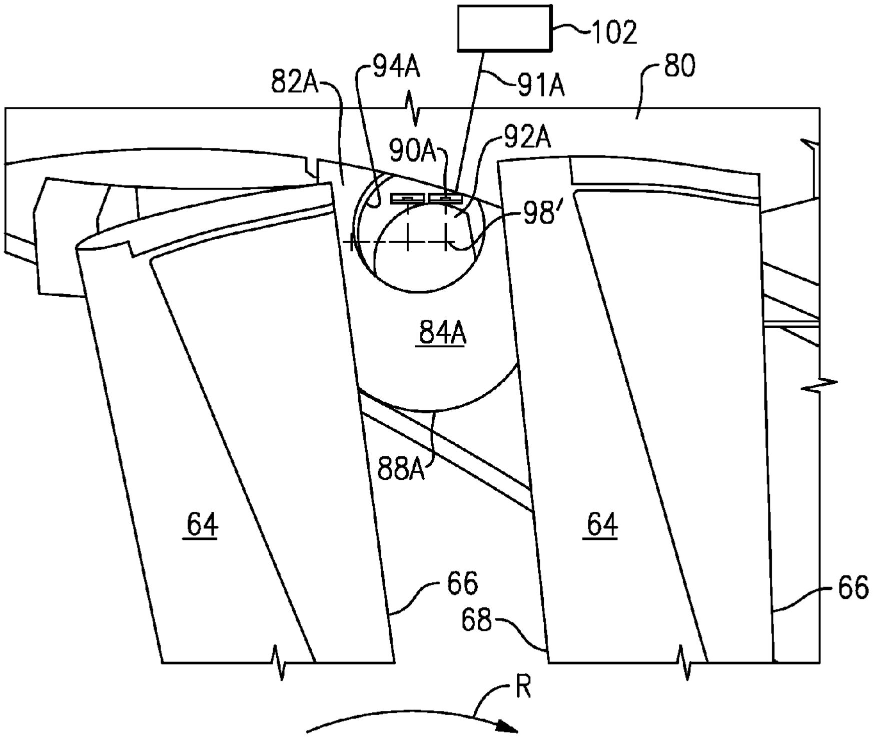
FIG. 3 illustrates a partial front view of a background radiation probe.
Figure 4:
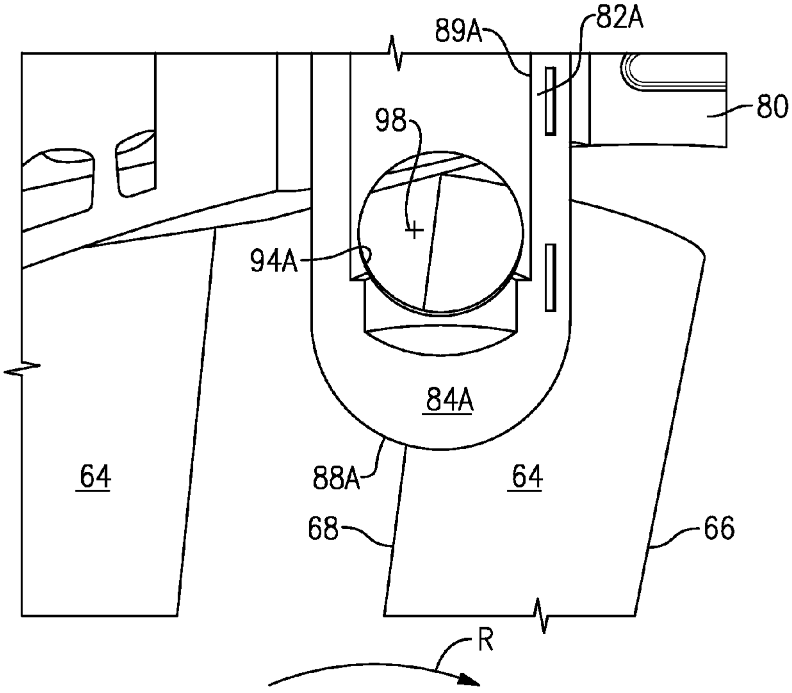
FIG. 4 illustrates a partial cross sectional view of the background radiation probe of FIG. 3.

Referring to FIGS. 3 and 4, with continuing reference to FIG. 2, the probe 82A includes a receiving lens 90A and a mirror 92A (shown schematically) located within an inner cavity 89A (shown in FIG. 4). The housing 84A defines an opening 94A at the proximal end 88A for defining a field-of-view of the receiving lens 90A. The mirror 92A is oriented in a direction upstream to define a line-of-sight 96A between the probe 82A and a target object 98 of the combustor section 26 (shown in FIG. 2). The field-of-view of the receiving lens 90A extends along the line-of-sight 96A at a span less than a distance extending chordwise between the leading and trailing edges 66, 68 of each of the rotor airfoils 64 and less than a distance between two adjacent airfoils 64 within one of the stages 58. In some examples, the target object 98 is located on an inner surface 100 of the combustor section 26. The lens 90A focuses radiation into a fiber optic line 91A, and the mirror 92A is configured to reflect radiation projecting along the line-of-sight 96A at a different orientation into the lens 90A. In another example, the probe 82A includes only the receiving lens 90A. In yet another example, the probe 82A includes only a mirror 92A. In a further example, the probe 82A does not include the lens 90A or the mirror 92A. However, other arrangements for redirecting and focusing energy are contemplated, including the replacement of the lens 90A and mirror 92A with a prism or similar structure.

The background radiation measurement system 81 includes a sensor 102 configured to detect radiation emitted from a radiation source. In some examples, the sensor 102 is an infrared sensor configured to detect a wavelength or a range of wavelengths within an electromagnetic radiation frequency range. In similar examples, the wavelength or a range of wavelengths is within at least one of near-infrared, mid-infrared and far-infrared frequency ranges. In yet another example, the sensor 102 is configured to detect visible light. In further examples, the sensor 102 is configured to detect radiation within a range of amplitudes. The sensor 102 is mounted external to the probe 82A, which may reduce cooling requirements due to exposure of the sensor 102 to the hot combustion gases. In other examples, the sensor 102' is located within the housing 84A of the probe 82A (shown in FIG. 2).

During operation, air is mixed with fuel and burned in the combustor section 28 to generate hot combustion gases. Therefore, the combustor section 28 emits background black-body radiation 104 downstream in a direction toward the probe 82A along the line-of-sight 96A. In some instances, each rotor airfoil 64 emits radiation due to exposure of the hot combustion gases in the core flow path C. In some examples, the sensor 102 is configured to receive radiation 104 at a first frequency range and filter or reject radiation at a second, different frequency range emitted by each rotor airfoil 64. In further examples, the sensor 102 is configured to receive radiation 104 at a first range of amplitudes and filter or reject radiation at a second, different range of amplitudes emitted by each rotor airfoil 64. In similar examples, the sensor 102 rejects radiation from other sources within the gas turbine engine 20.

The mirror 92A redirects the radiation 104 from the target object 98 along the line-of-sight 96A onto the lens 90A, and the lens 90A focuses the radiation 104 into the fiber optic line 91A coupled to the sensor 102. In another other example, the lens 90A directly receives the background radiation 104 projecting along the line-of-sight 96A from the target object 98 and focuses the background radiation 104 onto the sensor 102. In yet other example, the sensor 102 directly receives the background radiation 104 projecting along the line-of-sight 96A. It should be appreciated that the radiation source can include any component within the field of view of the probe lens 90A and spaced apart from each rotor airfoil 64, even in the absence of a direct line-of-sight of the combustor 26. For example, the radiation source can include the BOAS 72, the stator vanes 74, or another component of the turbine section 28. In further examples, the probe 82A is configured to receive coolant from a coolant source 95 (shown schematically in FIG. 2) to cool components within the inner cavity 89A. In one example, the coolant source 95 is a compressor section 24 which communicates bleed air to the inner cavity 89A. The coolant can be ejected out of the inner cavity 89A through a space between the receiving lens 90A and the opening 94A, or the coolant can be recirculated to another area of the gas turbine engine 20. In other examples, the coolant source 95 is external to the gas turbine engine 20 and is configured to provide gas coolant such as compressed nitrogen or shop air.

Each of the rotor blades 60 is configured to rotate in a direction R about the engine axis A and therefore minimizes the amount of radiation 104 emitted from the target object 98 to the probe 82A when the rotor airfoil 64 extend into the line-of-sight 96A. Once the rotor blade 64 rotates past the line-of-sight 96A, the mirror 92A begins receiving the radiation 104 on a receive spot 98' corresponding to the target object 98 and reflects the radiation 104 onto the receiving lens 90A. The lens 90A focuses the radiation 104 from the receive spot 98' into the fiber optic line 91A, which is communicated to the sensor 102.

The probe 82A is configured to generate a time-of-arrival signal in response to one of the edges 66, 68 extending into the line-of-sight 96A. In one example, the signal is based upon the leading edge 66 extending into the line-of-sight 96. In another example, the signal is based upon the trailing edge 68 extending into the line-of-sight 96A. Generating the signal in response to the trailing edge 68 may result in observing deflection or vibration of the rotor airfoils 64 at greater amplitudes than a leading edge configuration due to airfoil geometry.

Figure 5:
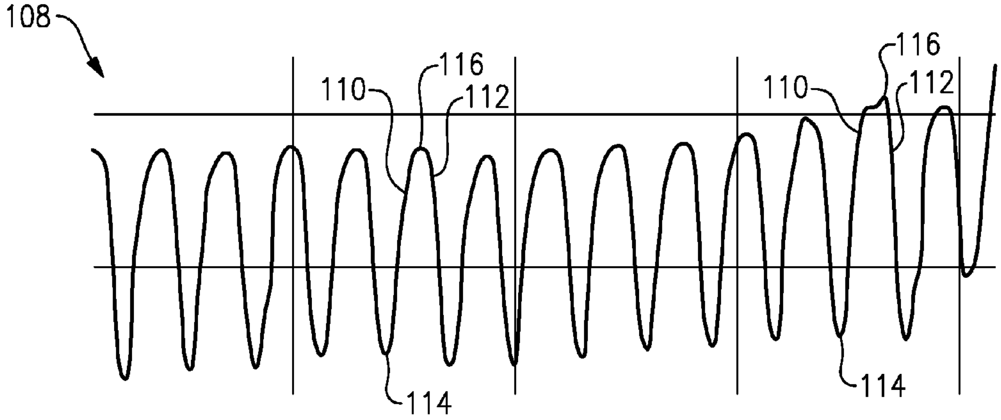
FIG. 5 illustrates an example time-of-arrival signal.

FIG. 5 illustrates an example analog time-of-arrival signal 108 including a rising edge 110, a falling edge 112, a valley 114 and a peak 116. In one example, the valley 114 corresponds to complete obstruction of the line-of-sight 96A by one of the rotor airfoils 64, thereby minimizing the amount of radiation 104 received by the probe 82A. The rising edge 110 corresponds to the trailing edge 68 extending into the line-of-sight 96, increasingly exposing the target object 98 to the probe 82A. The peak 116 corresponds to the target object 98 being completely visible to the probe 82A. Similarly, the falling edge 112 corresponds to the leading edge 66 of the next one of the rotor airfoils 64 extending into the line-of-sight 96A. In another example, the rising edge 110 corresponds to the leading edge 66 of one of the rotor airfoils 64, and the falling edge 112 corresponds to the trailing edge 68 extending into the line-of-sight 96A.

In some examples, background radiation measurement system 81 includes a controller 105 (shown schematically in FIG. 2) configured to monitor the time of arrival of each of the rotor airfoils 64. The controller 105 the signal generated by the probe 82A and transmitted to the controller 105 by at least one communication line 106 (shown in FIG. 2). The controller 105 can access data representing the expected time of arrival of each of the rotor airfoils 64 based upon a certain rotational speed and a given airfoil geometry. The actual time of arrival may be different from the expected time of arrival for a particular one of the rotor airfoils 64 due to conditions within the gas turbine engine 20. For example, the rotor blades 60 may vibrate or defect at high rotational speeds or due to thermal fatigue and mechanical distress, such as cracking.

Figure 6:
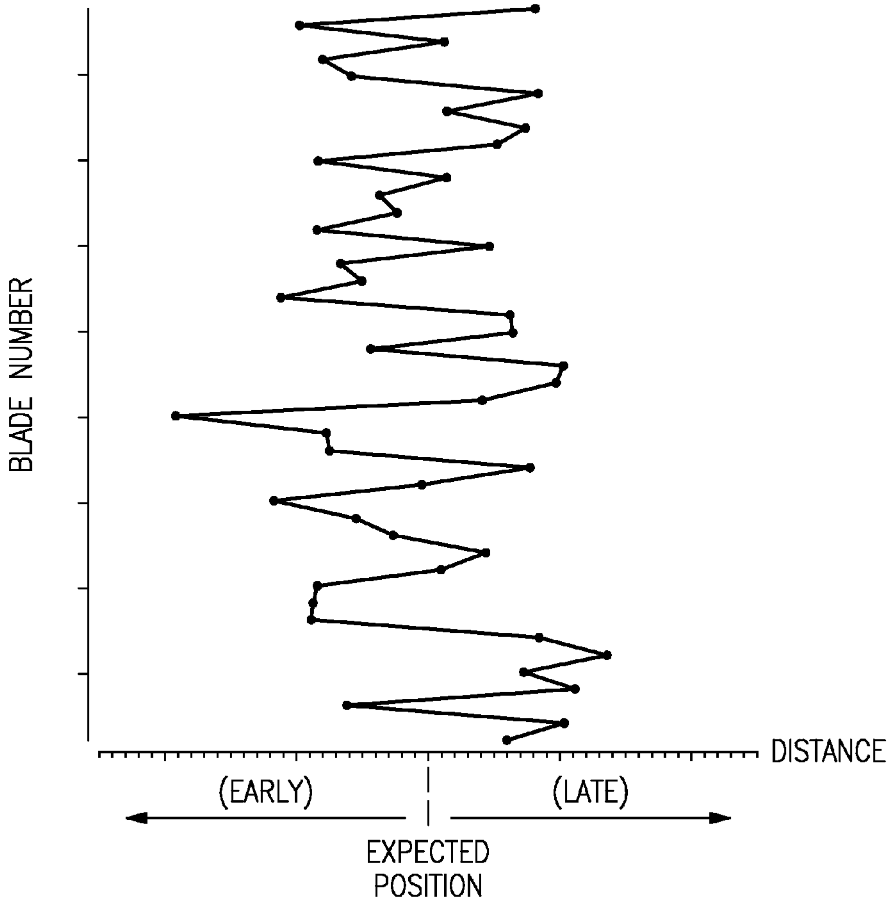
FIG. 6 illustrates an example blade spacing deviation plot.

The controller 105 is configured to calculate a blade spacing deviation based upon a comparison of the expected and actual times of arrival of the rotor airfoils 64. In one example of a blade spacing deviation plot illustrated by FIG. 6, a negative distance along the x-axis represents one of the rotor airfoils 64 (represented by the y-axis) arriving earlier than expected, and a positive distance represents one of the rotor airfoils 64 arriving later than expected. The controller 105 is configured to determine the amplitude and frequency of deflection of the rotor airfoils 64 based upon deviations from the expected time of arrival.

During operation, the combustor 26 emits radiation 104 from the target object 98 along the line-of-sight 96A. One of the rotor airfoils 64 rotates into and begins to obstruct the line-of-sight 96A, thereby minimizing the amount of radiation 104 being received by the probe 82A. As one of the edges 66, 68 extends into and through the line-of-sight 96A, the sensor 102 receives the radiation 104, causing the probe 82A to generate and communicate the time-of-arrival signal to the controller 105. The controller 105 compares the expected and actual time of arrival for the respective one of the rotor airfoils 64 and calculates a blade spacing deviation. In some examples, the controller 105 is configured to send an alert to another system of the gas turbine engine 20 in instances where an absolute value of the blade spacing deviation is greater than a predetermined limit.

It should be appreciated that the probe can be positioned at other areas of the turbine section 28. In one example, a probe 82B extends from one of the outer platforms 80 of the stator vanes 74 and defines a line-of-sight 96B extending downstream toward one of the inner platforms 76 of the stator vanes 74 (shown in FIG. 2). In another example, a probe 82C is located within one of the blade outer air seals (BOAS) 72 and defines a line-of-sight 96C extending radially inward toward the engine axis A to receive background radiation from the (shown in FIG. 2). The probe 82C is configured to receive background radiation from the root 62 of each of the rotor blades 60 (shown in FIG. 2). The probe 82C includes a receiving lens 90C configured to receive background radiation from the root 62 of each of rotor airfoil 64. Optionally, the probe 82C can include a mirror to redirect background radiation onto the receiving lens 90C. The background radiation received by the received lens 90C is minimized when an edge, including the tip 70 of one of the rotor airfoils 64, extends into the line-of-sight 96C.

The background radiation measurement system 81 includes many benefits over conventional laser-based solutions. The probe is optimized to gather background radiation from the combustor 26 and other background radiation sources, rather than rejecting or filtering the background radiation. Thus, system complexity can be reduced. The sensor 102 can measure the position of an airfoil at high engine power, whereas radiation detected by a conventional laser-based system would be washed out by background radiation from the combustor 26. Thus, utilization of background radiation measurement system 81 results in increased detection of vibratory modes of interest and greater signal strength over the full range of operating conditions of the gas turbine engine 20 or another system deploying the background radiation measurement system 81. Also, the probe includes a relatively smaller form factor due to elimination of the laser generator and transmit fiber which are utilized in laser-based systems, reducing manufacturing cost and the coolant requirements. The relatively smaller form factor also reduces aerodynamic losses within the core flow path C.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A turbine section comprising:
an airfoil including an edge;
a probe positioned a distance from the airfoil configured to detect radiation emitted from a radiation source; and
a sensor operatively coupled to the probe and configured to generate a signal utilized to determine when the edge of the airfoil extends into a line-of-sight between the probe and the radiation source, wherein the radiation source emits radiation at a first range of amplitudes and the airfoil emits radiation at a second range of amplitudes different from the first range of amplitudes.

2. The turbine of claim 1, wherein the sensor generates the signal in response to passage of the edge through the line-of-sight.

3. The turbine of claim 2, comprising a controller electrically coupled to the sensor, the controller configured to calculate a spacing deviation based upon a comparison of an expected time of arrival and an actual time of arrival of the edge, and wherein the actual time of arrival is based upon the signal.

4. The turbine of claim 1, wherein the sensor is an infrared sensor.

5. The turbine of claim 4, wherein the infrared sensor is configured to detect a wavelength in an electromagnetic radiation frequency range.

6. The turbine of claim 1, wherein the radiation source is a combustor.

7. The turbine of claim 1, wherein the radiation source emits radiation at a first frequency range and the airfoil emits radiation at a second frequency range different from the first frequency range.

8. The turbine of claim 1, wherein the probe includes a housing extending radially inward from a platform of a stator vane.

9. The turbine of claim 8, wherein the housing is configured to receive coolant from a coolant source.

10. The turbine of claim 1, wherein the sensor generates the signal in response to rotation of the airfoil through the line-of-sight.

11. A gas turbine engine comprising:

a compressor section;

a combustor section;

a turbine section including a plurality of turbine blades and a plurality of stator vanes arranged circumferentially about an engine axis, at least one probe positioned a distance from the turbine blades configured to detect radiation emitted from the combustor section, and a sensor operatively coupled to the at least one probe and configured to generate a signal utilized to determine when an edge of each of the turbine blades extends into a line-of-sight between the at least one probe and the combustor section, wherein the edge is a trailing edge of one of the turbine blades, and the sensor generates the signal in response to passage of the trailing edge through the line-of-sight; and a controller electrically coupled to the sensor, the controller being operable to calculate a spacing deviation based upon a comparison of an expected time of arrival and an actual time of arrival of the trailing edge, and wherein the actual time of arrival is based upon the signal.

12. The gas turbine engine of claim 11, wherein the sensor is an infrared sensor.

13. The gas turbine engine of claim 12, wherein the at least one probe includes two probes spaced apart from each other circumferentially about the engine axis.

14. The gas turbine engine of claim 11, wherein the turbine section is a low pressure turbine spaced axially from a high pressure turbine.

15. The gas turbine engine of claim 11, wherein the at least one probe includes a housing extending radially inward from a platform of one of the stator vanes.

16. The gas turbine engine of claim 11, wherein the sensor generates the signal in response to rotation of the edge of one of the turbine blades through the line-of-sight.

17. The gas turbine engine of claim 16, wherein the combustor section emits radiation at a first range of amplitudes and the turbine blades emit radiation at a second range of amplitudes different from the first range of amplitudes.

18. The gas turbine engine of claim 11, wherein the combustor section emits radiation at a first frequency range and the turbine blades emit radiation at a second frequency range different from the first frequency range.

19. A method of monitoring an airfoil, comprising:

emitting radiation from a combustor;

detecting the radiation along a line-of-sight from a position a distance from an airfoil;

generating a signal in response to rotation of the airfoil through the line-of-sight, the signal being based upon radiation emitted from the combustor; and determining a spacing deviation based upon a comparison of an expected time of arrival and an actual time of arrival of an edge of the airfoil, and wherein the actual time of arrival is based upon the signal.

20. The method as recited in claim 19, wherein the signal corresponds to a trailing edge of the airfoil extending into the line-of-sight.

21. The method as recited in claim 19, wherein the radiation emitted by the combustor is infrared radiation.

22. The method as recited in claim 19, wherein the combustor emits the radiation at a first frequency range and the airfoil emits radiation at a second frequency range different from the first frequency range.

23. The method as recited in claim 19, wherein the combustor emits the radiation at a first range of amplitudes and the airfoil emits radiation at a second range of amplitudes different from the first range of amplitudes.

* * * * *